United States Patent [19]

Markwardt et al.

[11] Patent Number: 5,354,229
[45] Date of Patent: Oct. 11, 1994

[54] PROCESS AND A DEVICE FOR SUSPENDING CHAINS OF SAUSAGES IN LOOPS

[75] Inventors: Klaus Markwardt, Laatzen; Reinhardt K. Ristau, Verden/Aller; Ledger Sprehe, Muhlen, all of Fed. Rep. of Germany

[73] Assignee: VEMAG Maschinenbau GmbH, Aller, Fed. Rep. of Germany

[21] Appl. No.: 980,809
[22] PCT Filed: Jun. 30, 1992
[86] PCT No.: PCT/EP92/01464
§ 371 Date: Apr. 22, 1993
§ 102(e) Date: Apr. 22, 1993
[87] PCT Pub. No.: WO93/00821
PCT Pub. Date: Jan. 21, 1993

[30] Foreign Application Priority Data

May 7, 1991 [DE] Fed. Rep. of Germany ....... 4122370

[51] Int. Cl.⁵ .............................................. A22C 15/00
[52] U.S. Cl. .................................. 452/51; 452/186
[58] Field of Search ...................... 452/51, 46, 186

[56] References Cited

U.S. PATENT DOCUMENTS

| 3,115,668 | 12/1963 | Townsend | 452/51 |
| 4,233,709 | 11/1980 | Smith et al. | 452/51 |
| 4,761,854 | 8/1988 | Schnell et al. | 452/51 |
| 5,092,813 | 3/1992 | Kasai et al. | 452/51 |
| 5,163,864 | 11/1992 | Burger et al. | 452/51 |

FOREIGN PATENT DOCUMENTS

| 2744350 | 4/1979 | Fed. Rep. of Germany . |
| 8300017 | 6/1983 | Fed. Rep. of Germany . |
| 3202026 | 8/1983 | Fed. Rep. of Germany . |
| 4014610 | 8/1991 | Fed. Rep. of Germany . |

Primary Examiner—Willis Little
Attorney, Agent, or Firm—Wood, Herron & Evans

[57] ABSTRACT

A process and device are disclosed for hanging sausage chains in loops. Successive hooks that move in an essentially horizontal transport plane engage and carry sausage links at twist points located between predetermined adjacent links. Twist points are engaged at an interception point of the hook defined by a portion of a first member disposed perpendicularly to the direction of movement of the hooks. Each engaged twist point is then rotated about an approximately vertical axis in a predetermined direction of rotation over an angle of about 90°. After this rotation, the engaged twist points are disposed on a prong at the outer end of the hook. The prong and two adjacent spreading elements extend in the direction of transport and serve to support adjacent links without allowing them to touch. The suspended links are thereby supported in a spiral loop which is then placed over a smoking skewer.

29 Claims, 5 Drawing Sheets

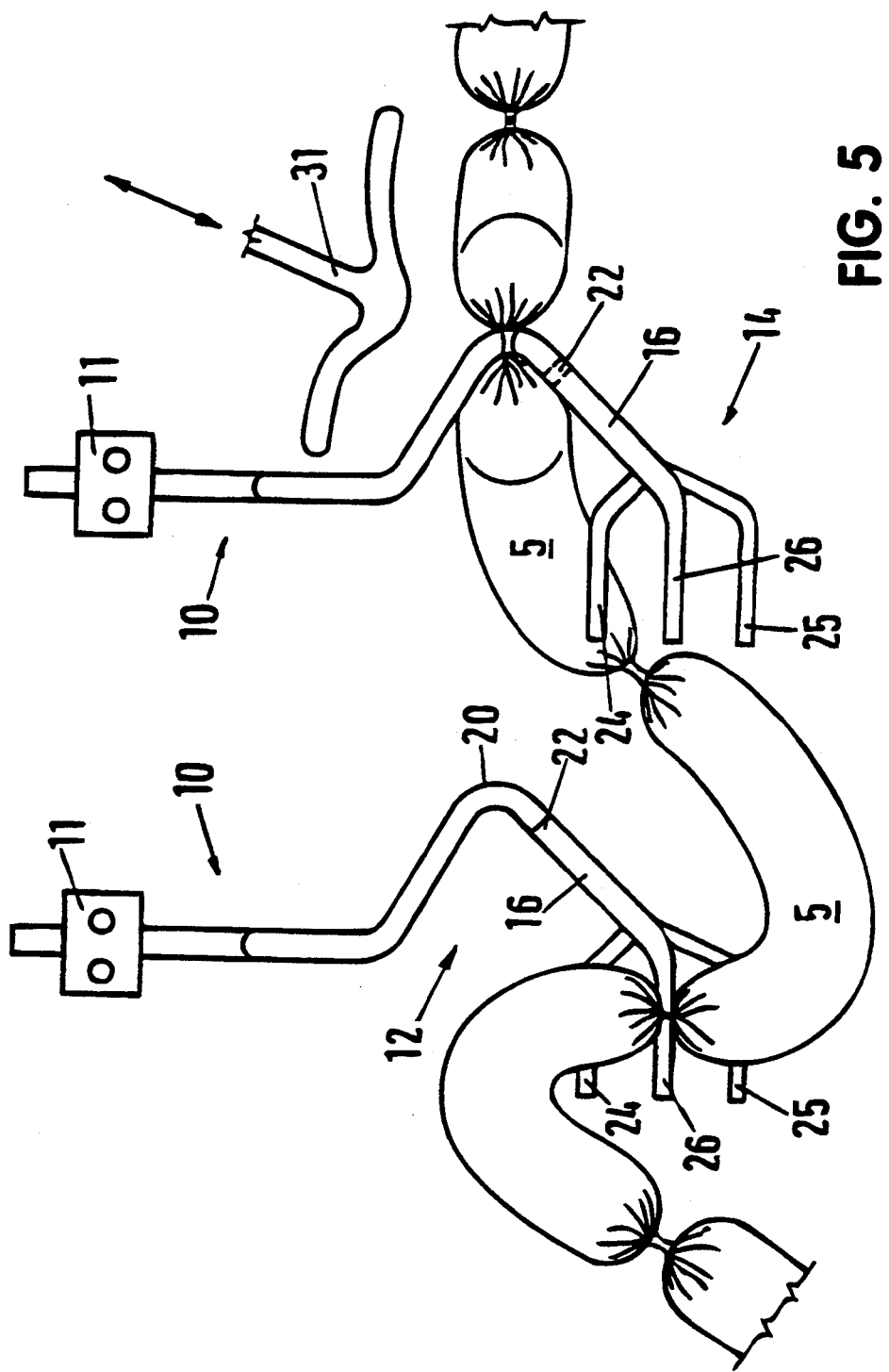

PROCESS AND A DEVICE FOR SUSPENDING CHAINS OF SAUSAGES IN LOOPS

SPECIFICATION

Field of the Invention

The invention relates to a process for suspending chains of sausages in loops, in which successive hooks that rotate in an essentially horizontal plane grasp, at a transfer point, a twist point positioned roughly vertically there and located between two sections of the chain of sausages and convey it out of the vertical plane passing through the transfer point, and also an appropriate device for performing said process.

Background of the Invention

Sausages are normally produced by sausage filling machines in the form of long portioned sausage chains. Two adjacent sausages are divided from one another by a twist point. After a chain of sausages has been arranged in loops, a smoking skewer or stick is pushed through the loops. Sausages having natural skins are previously wound around the smoking stick in loop form. The chain of sausages is then deposited in this form onto a smoking truck, which is subsequently conveyed into a smoke house. During smoking it is crucial that the sausages do not touch, otherwise light patches would remain at the points of contact, which would not only have an unfavourable effect on the external appearance of the sausages but would also reduce their keeping qualities.

Mechanical suspension devices (e.g. DE-P 27 44 350.1) are known, with which a chain of sausages can be automatically hung in loops after it has left a filling machine. In this known suspension device hooks are attached to an endless chain that rotates essentially in a horizontal plane. A feed mechanism for the chain of sausages is also provided, the outlet of which opens in the space above the plane of transport and vertically above an area scanned by a reception area for the hooks. A switch scanning the twist points of the chain of sausages is located in the area of movement of the sausage chain above the transport plane and is connected to a control mechanism for driving the endless chain and/or the feed mechanism. The free end regions of the hooks are constructed as V or U shapes in two planes.

However the known suspension devices are only suitable for sausages which are produced with artificial skins. This is because these sausages have certain advantageous properties for their further processing which are not displayed by sausages produced with natural skins: their diameter and their length are to a great extent constant, they have either no curvature at all or, when the skin is pretreated in a suitable manner, regular curvature, good sliding properties and low sensitivity to mechanical stresses.

Natural skin sausages on the other hand have varying diameters and lengths. It is crucial that they normally have their natural curvature and that this curvature varies. Furthermore their sliding properties are poor and their sensitivity to mechanical stresses is relatively great.

The previously known suspension devices are not in practice suitable for sausages made with natural skins because of the variability of their properties. In particular the fact that the suspended sausages touch slightly because of their curvature can not be avoided, with the result that these touching parts were insufficiently smoked or not smoked at all and consequently both the storage life is reduced and also an optically unsatisfactory result was obtained with respect to the external appearance because of the lighter parts.

SUMMARY OF THE INVENTION

The object of the invention is therefore to provide a process and also a device for hanging sausage chains in loops, in which sausages having natural skins can also be processed and can be positioned for transfer onto a smoking skewer.

In a process for suspending sausage chains in loops, in which successive hooks that rotate in an essentially horizontal transport plane grasp, at a transfer point, a twist point positioned roughly vertically there and located between two sections of the chain of sausages and convey it, optionally cyclically, out of the vertical plane passing through the transfer point, the distance between the advancing twist point of each section and the following twist point on the hook in the direction of transport is set, at least in the region of the transfer point, so that it is great enough for each of the naturally curved sausages in the section of the chain of sausages located between two hooks to assume a rotationally stable position with respect to the straight line connecting both twist points that delimit the sausage, and the twist point at the front end of the section, seen in the direction of transport, then rotates around a roughly vertical axis in a predetermined direction of rotation by an angle in the order of 90°.

The vertical axis is advantageously moved parallel to itself towards the free hook end when rotated.

The rotational movement may be effected and/or assisted by a downwardly directed movement of the twist point located at the advancing end of the section.

The initiation of the downward movement is effected by displacing the twist point on an inclined plane.

To form a sufficiently large through-aperture for the smoking skewer, the sausages are also spread apart on both sides of said twist point towards the end of or after the twisting movement, at least in the vicinity of the twist point.

The twist point may also be positioned on a smoking skewer by means of at least one inclined plane. For this purpose the inclined plane can be produced by the rotation of a part of a delivery area of the hook supporting the twist point around an essentially horizontal axis.

The achievement of the object for a suspension device known from DE-P 27 44 350.1 is effected in that the distance between the advancing twist point of each section and the following twist point on the hook in the feed direction, at least in the area of the transfer point, is great enough for each of the naturally curved sausages in the section of the sausage chain located between two hooks to assume a rotationally stable position with respect to the straight line connecting both twist points that delimit the sausage, in that the hooks, proceeding from their attachment element associated with a transport chain, comprise a reception area, extending essentially vertically to the direction of transport, seen in plan view, for receiving a twist point and also a delivery area bent in plan view essentially by 90° thereto in or against the direction of transport, and in that a device is provided for the displacement of the twist point from the reception area into the delivery area.

The hook preferably comprises at least one first, downwardly extending, inclined plane, which lies between the delivery area and the reception area and towards the open end of the delivery area in the plan view of the hook can be bent so that the twist point guided over it performs (only) a part of its rotational movement.

A second inclined plane, which is connected to the first inclined plane, extends essentially vertically downwardly and passes into the delivery area, may also be provided.

The reception area preferably comprises an interception point for a twist point acting in the direction of transport of the hook and is limited with respect to the first inclined plane by an upwardly directed hump. The delivery area preferably comprises a prong extending in the direction of transport for receiving a twist point, and this prong rises slightly towards its free end to prevent the twist point unintentionally slipping off. Beneath and on both sides of the part of the delivery area provided for receiving the twist point may be located spreading elements. The spreading elements are preferably the lower legs of L-shaped formations, the main planes of which are disposed extending roof-like with the ridge in the direction of transport, whereby the ridge extends over the prong and the free L-shaped legs lie on both sides of and beneath the prong.

Furthermore at least one deflector can be provided, which extends, starting from the reception area, towards the transport chain in the direction of transport behind both the reception area and also the delivery area, in order to restrict a pendulum movement of parts of the sausage chain in the direction of transport behind the reception area.

Seen parallel to the direction of transport, the hook is also designed essentially in the shape of a U open at the bottom, at one leg of which the attachment element is located and at the other leg of which the delivery area is located. The reception area is provided in the region of the web of the U.

The hook can preferably be tilted around a horizontal axis extending vertically to the direction of transport in the direction in which the delivery area is bent, so that a twist point located in the delivery area can slide from the hook.

In the region of the transfer point is advantageously provided a photoelectric barrier, with which a twist point of the chain of sausages supplied by the feed mechanism is detected, and with which a control device can be controlled, which either influences the rotation of the hooks or the feed mechanism.

The device for the displacement of a twist point from the reception area of a hook in its delivery area preferably comprises a shackle which can be moved pneumatically or by similar means between two positions roughly perpendicular to the feed direction, and which is extended every time a hook is guided through its range of action.

In an embodiment in which the hooks are attached to an endless chain, which is guided over two guide wheels, one of which is driven, the feed mechanism can be displaceably disposed along the periphery of one wheel so as to define the position of the transfer points with respect to the passing hooks.

The achievement according to the invention, which is equally suitable for small sausages filled in natural skins and sausages of greater size, consequently results in the formation of a continuous spiral, to which the natural curvature of the skin and the sausage is adapted.

At the same time it is of course still possible to process sausages having artificial skins.

Further details, features and advantages of the invention result from the following description of an exemplified embodiment means of the drawings.

BRIEF DESCRIPTION OF THE DRAWINGS

FIG. 5 shows an enlarged representation of the region of the device designated by "A" in FIG. 1.

DESCRIPTION OF THE PREFERRED EMBODIMENTS

Figure 1:
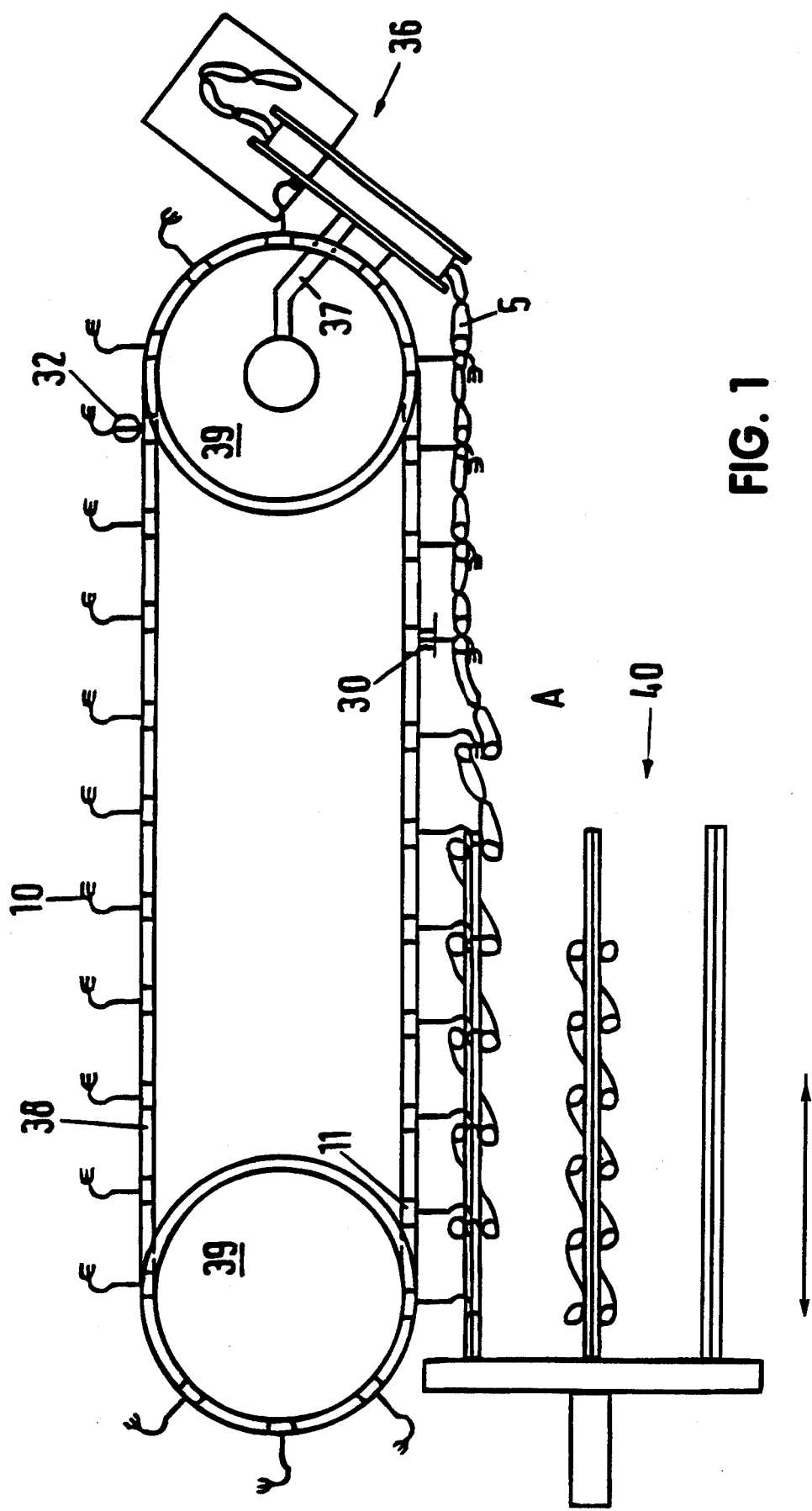
FIG. 1 shows a diagrammatical plan view of an exemplified embodiment of a suspension device.
Figure 4:
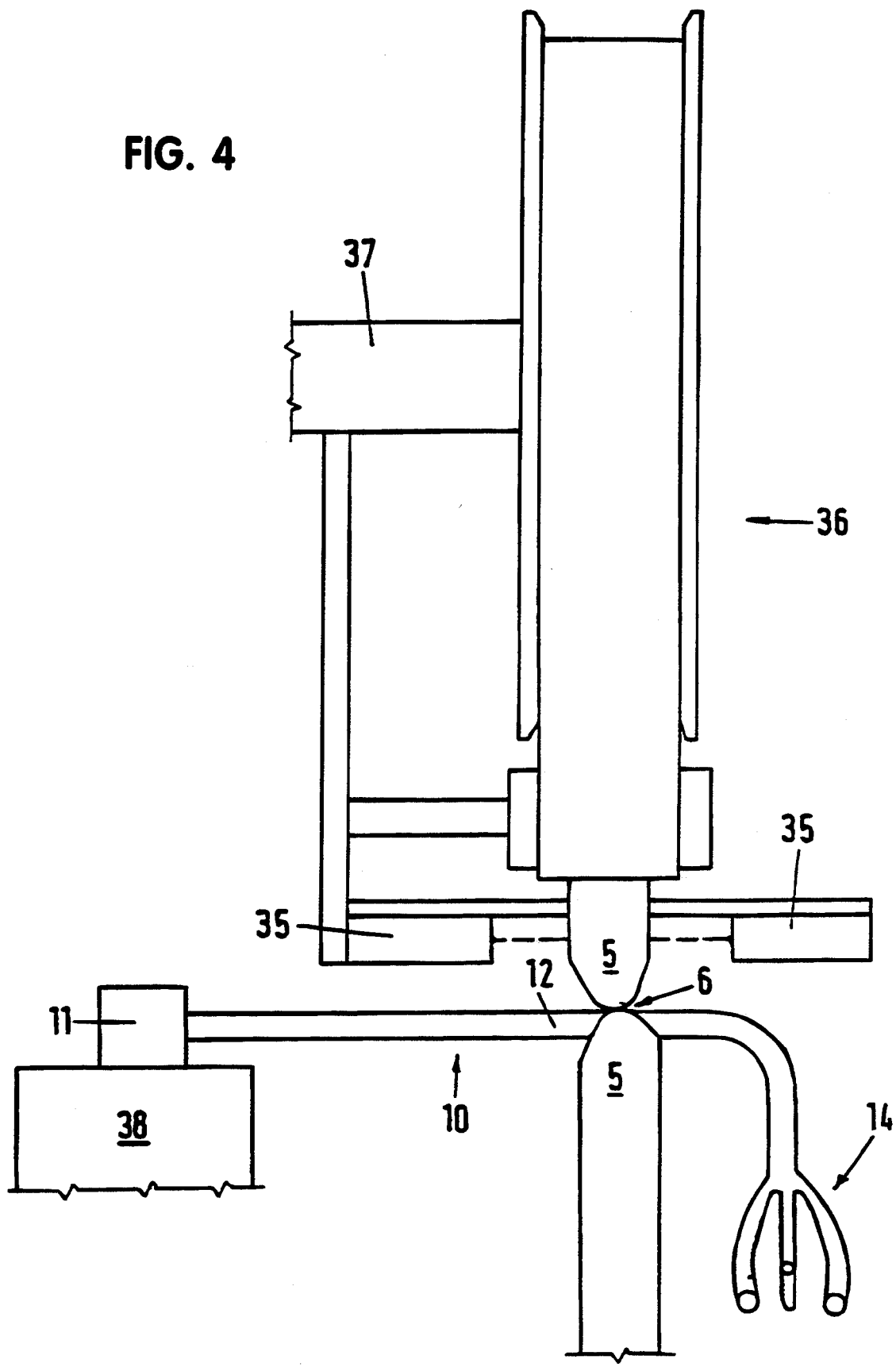
FIG. 4 shows a feed mechanism as a diagrammatical partial representation with a hook and a part of a transport chain.

In the exemplified embodiment shown in FIG. 1 an endless chain 38 is guided over two guide wheels 39, one of which is driven. Hooks 10, which at a transfer point at a feed mechanism 36 take hold of a section of a chain of sausages, are mounted at regular intervals on the endless chain. The transport of the chain is effected cyclically, should the occasion arise, by the signals from a control appliance controlled by a photoelectric barrier 35 (FIG. 4). The photoelectric barrier responds to twist points in the chain of sausages supplied by the feed mechanism 36. The hooks are conveyed past a device 30, which displaces a twist point lying in a reception area 12 of each hook 10 into a delivery area 14 by means of a shackle 31 (see FIG. 5). During this movement a rotation of the twist point through roughly 90° is simultaneously performed, as a result of which the chain of sausages is brought into a spiral shape and—as can be seen from FIG. 1—a through-aperture for a smoking skewer 40 is produced. The chain of sausages suspended in a spiral shape is conveyed further over the smoking skewer. If the hook supporting the beginning of the sausage chain reaches the end of the smoking skewer disposed in the feed direction, the hook is rotated by roughly 90° around an essentially horizontal axis perpendicular to the feed direction, so that the twist point slides on the smoking skewer. This occurs, for example, during a phase in which the belt is inoperative. During the next feed cycle the next twist point is moved according to the feed cycle amplitude towards the deposited twist point and during the next pause in movement is deposited in the same way on the smoking skewer 40. The distance between two deposited twist points can be altered by the appropriate (cyclical) movement of the smoking skewer in the direction of transport of the belt or in the opposite direction thereto.

The feed mechanism 36 is formed by a feeding wheel which can rotate around a horizontal axis above the horizontal plane of transport, by which successive sausages and twist points 6 respectively are conveyed approximately vertically into the region of the transfer point lying in the transport plane. The feeding wheel is pivoted via an arm 37 in the point of rotation of one of the guide wheels 39 and can be swivelled along the periphery of the wheel. The position of the transfer point with respect to the passing hooks is determined by swivelling the feeding wheel. Furthermore the required position for the twist points leaving the feeding wheel is guaranteed by the photoelectric barrier and by the control mechanism for the feeding wheel. In this way it is ensured that, despite the poor sliding ability of the sausages, a twist point always comes to lie in the reception area 12 of a passing hook 10.

The distances between the attachment points of the individual hooks on the endless chain 38 are largely dependent on the length of the individual sausages. This distance has to be empirically determined so that sausages hanging in the spiral can not touch.

To achieve the spiral shape in which the natural curvature of the individual sausages follows the spiral line the following procedure is used:

The distance between the reception areas 12 of two successive hooks 10 is greater in the place where the endless chain 38 passes over the guide wheels 39 than in the areas in which the chain is guided in a straight line, with the result that, with the transfer of one section of the sausage chain in the curved course of the endless chain, the torque caused by the gravitational force and the tensile forces at the twist points is particularly large and an immediate rotation of each sausage around its axis of rotation is guaranteed. After the rotationally-stable position of the sausages has been achieved, the distances between the reception areas 12, in each of which a twist point lies, may be slightly smaller. This is the case in the regions of the endless chain 38 guided in rectilinear manner, as there the hooks are approximately parallel to one another. However it must be ensured that adjacent sausages do not touch, in particular after they have been deposited on the smoking skewer 40.

In the drawings is also shown a proximity switch 32, which produces signals when a hook moved by the endless chain comes into its range of action. The signals are processed in the control appliance and after the endless chain has stopped they can be used to reproduce the synchronization between the chain and the feed mechanism.

Figure 2:
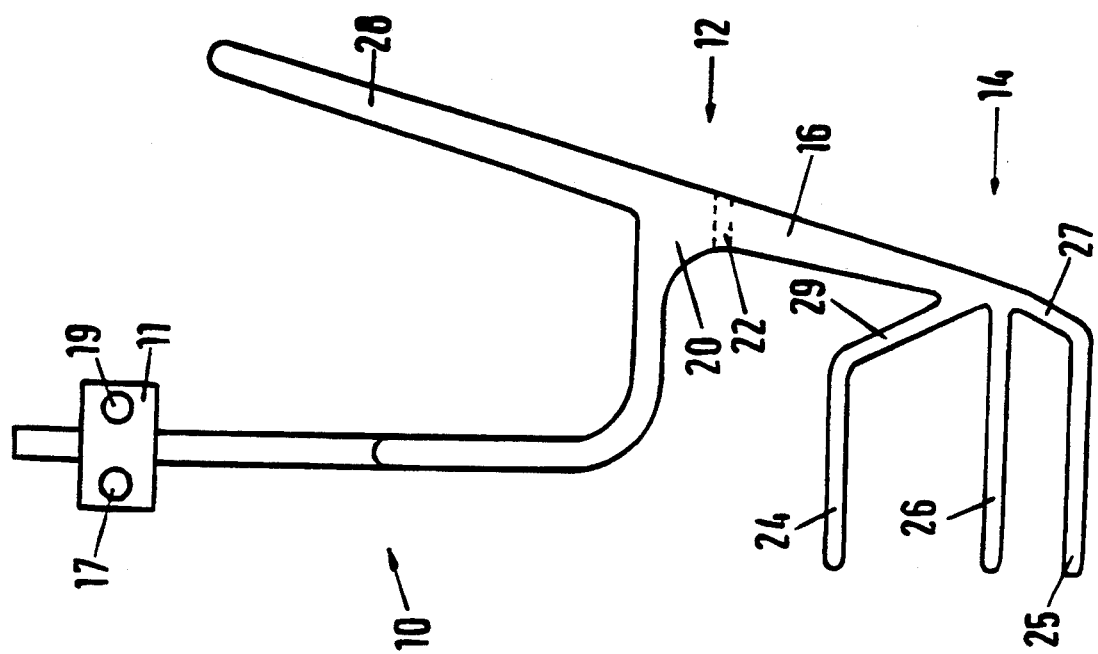
FIG. 2 shows a hook in plan view.

In FIG. 2 the hook 10 is shown in plan view. An attachment element 11 is used to attach the hook to the endless chain 38. The hook is divided into the reception area 12 and the delivery area 14. It also comprises a deflector 28 issuing from the reception area, which extends in the direction of transport both behind the reception area and also behind the delivery area towards the transport chain and is intended to prevent parts of sausage chains swinging in the direction of transport behind the reception area. The reception area 12 comprises an interception point 20, which guarantees that a twist point is securely grasped. The interception point becomes wider in the direction of transport and forms a direct link with the adjacent regions of the hook. As the hook is made from round stock, in connection with a relatively large radius of curvature of the region of the hook forming the intersection point, it is guaranteed that even the natural-skin sausages are received without any problems in the reception area despite their poor sliding ability.

Figure 3:
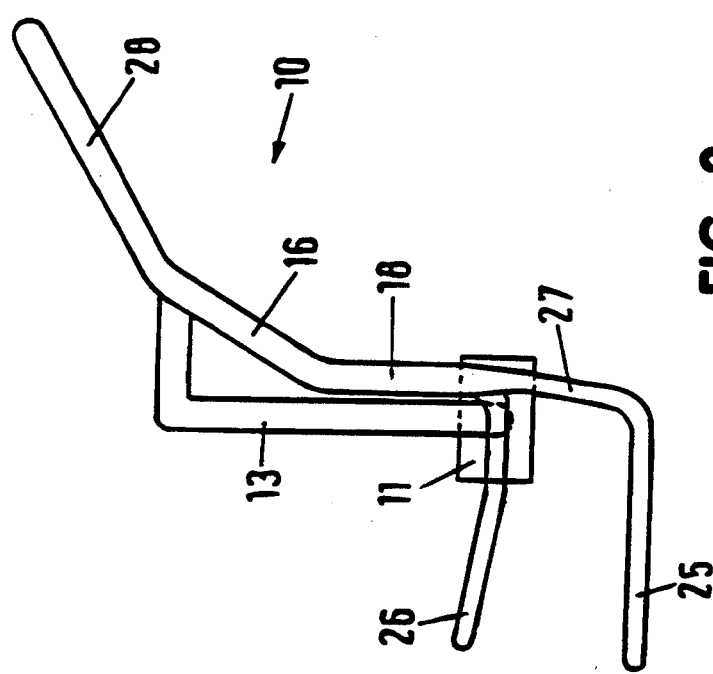
FIG. 3 shows a representation of a hook from the front, i.e. towards its attachment point.

The reception area is delimited towards the delivery area by an upwardly directed hump 22. This hump prevents a twist point resting in the reception area sliding off prematurely. The area between the hump 22 and the delivery area 14 is formed by a first and a second downwardly directed inclined plane 16, 18, both of which are also shown in FIG. 3. The first inclined plane 16 is bent, as shown in FIG. 2, towards the free ends of the delivery area. The second inclined plane extends vertically downwards and ends in the delivery area 14 of the hook. With respect to a continuous movement of the natural-skin sausages, which have inherently poor sliding properties, these areas also have exclusively direct links, in particular on both sides of and including the hump 22, and also has bends with sufficiently large radii of curvature.

In FIG. 3 is also shown the attachment element 11 and also a vertically rising area 13 connected thereto at a horizontal distance, to the upper end of which the approximately horizontal reception area is connected.

On the two inclined planes connected hereto the rotational point supported by the hook is guided with a downward twisting movement by roughly 90° around a vertical axis, which is displaced parallel, and deposited on a prong 26 of the delivery area. The movement of the twist point along the inclined plane clearly reduces the friction between the natural skin and the hook, as a result of which the described twisting of the twist point is made possible without the risk of damaging the natural skin.

The desired spiral shape of the chain of sausages is produced and the through-aperture for the smoking skewer is created by the rotation. This is assisted by spreading elements 24, 25, which are disposed beneath and on both sides of the prong 26 and in plan view extend roughly parallel thereto. The areas of the sausages connected to the twist point are kept apart by the spreading elements. The spreading elements are the lower legs of preferably L-shaped formations, the main planes of which are disposed roof-like with the ridge in the direction of transport. The ridge extends above the prong 26.

From the point 23 at which the imaginary ridge passes through the hook, the other legs 27, 29 of the two L-shaped formations extend downwardly and outwardly at an acute angle to one another. The rear end of the prong seen in the direction of transport and also the legs 27, 29 are closed by a common, triangular end wall corresponding in its dimensions to the roof cross section, said wall not being shown in the drawings. In its edge areas corresponding to the roof slopes, the wall directly passes into the L-shaped legs 27, 29 extending there to the ridge and is used as a deflector for parts of sections of the sausage chain.

To prevent the twist point prematurely sliding off the delivery area during the (cyclical) further conveyance of a hook, a part of the prong 26 is angled upwards slightly in front of its free end. The prongs and the spreading elements are also made of round stock and have rounded end surfaces so that the danger of a twist point becoming caught as it slides off the delivery area is out of the question.

Figure 6:
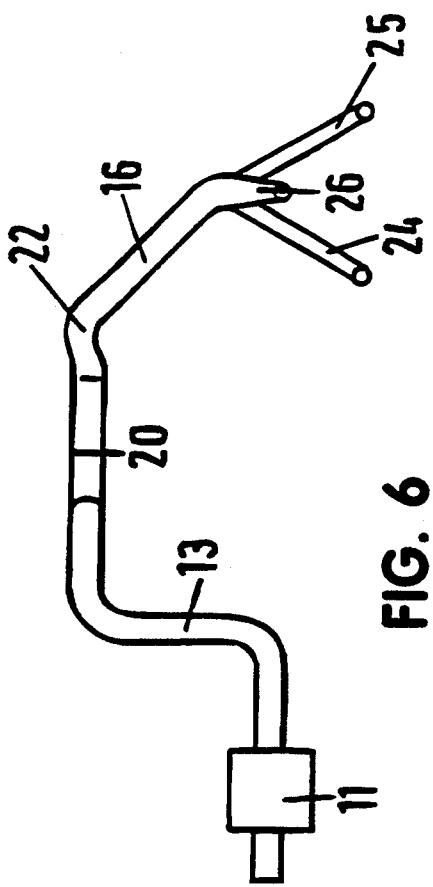
FIG. 6 shows another embodiment of a hook in a view against the direction of transport.

The hook 10 itself is constructed approximately in the form of a U open at the bottom, as shown in FIG. 6, to one leg of which the attachment element 11 is connected and at the other leg of which the delivery area 14 is provided. The reception area 12 is located in the region of the web of the U. The attachment element 11 and the supporting area of the twist point on the prong 26 lie on a common horizontal axis extending perpendicular to the direction of transport (FIGS. 3 and 6).

Because of this design the required overall height of the device can be kept small.

The attachment element 11 is constructed in the form of a cuboid, in which the hook is pivoted with a horizontal end section 15 around said axis. The hook is secured by means of a snap-in locking device at least in its operational position shown in FIG. 5. Furthermore on both sides of the end sections 15 the cuboid 11 comprises two bore holes 17, 19 extending perpendicular thereto for receiving attachment bolts of the endless chain.

FIG. 4 shows the region in which a chain of sausages is transferred section by section to the hook 10 attached to the endless chain 39 (transfer point). The position of the photoelectric barriers 35—35 above the reception area 12 of the hooks 10 can also be seen.

FIG. 5 shows a plan view of the region of the path of transport, in which a twist point is displaced from the reception area 12 of the hook 10 into its delivery area 14. In particular a shackle 31 of the mechanism for the displacement 30 is shown, and its movement in the direction of the arrow towards the sections of a pair of sausages lying beneath the reception area pushes the common twist point of the sausages over the hump 22 and initiates the downward and rotational movement over the first and second inclined plane respectively, 16, 18. As shown in the left-hand part of the representation, the twist point then enters the delivery area and is deposited on the prong 26. The spreading elements 24, 25 therefore guarantee that the through-aperture already created because of the twisting movement is sufficiently large for a smoking skewer.

Figure 7:
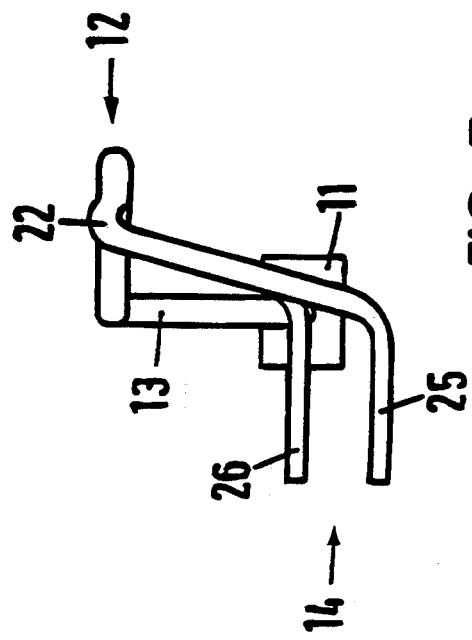
FIG. 7 shows a representation of the hook as shown in FIG. 6 from the front, i.e. towards its attachment point.

FIG. 6 shows another embodiment of the hook 10 in a view opposite to the direction of transport. In this representation it is clear that the formation of the hump 22, which passes directly into the adjacent areas, and the radii of curvature are relatively large, so that as described above, in each case it is possible for a twist point to be pushed over it in a trouble-free manner. As shown in FIG. 7, the dimensions of the first vertical section 13 of the hook are such that the delivery area of the prong 26 lies on an axis extending horizontally through the attachment element 11 and at right angles to the direction of transport.

Figure 8:
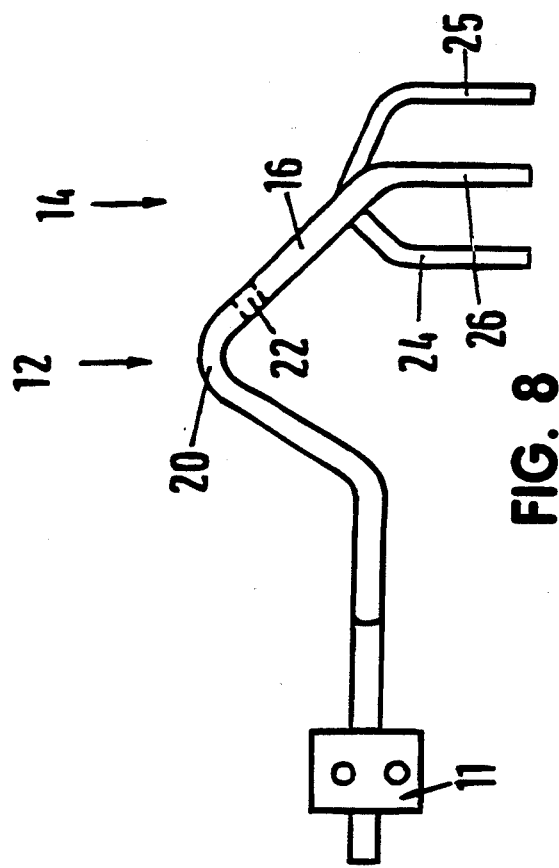
FIG. 8 shows the hook as shown in FIG. 6 in plan view.

In this embodiment a deflector is not provided. As shown in FIG. 8, the reception area is constructed in the form of a V open in the direction of transport. The interception point 20 is also constructed with a sufficiently large radius of curvature and passes directly into the adjacent areas. It is delimited towards the delivery area by the hump 22.

To the hump 22 is connected the downwardly directed first inclined plane 16, which in turn—seen from above—is bent in the direction in which the free ends of the delivery area 14 point. The spreading elements 24, 25 are disposed to side of and beneath the prong 26, in a similar manner as in the embodiment described above.

We claim:

1. A device for suspending a chain of sausage links or the like, wherein adjacent links are connected by twist points, said device comprising:

a chain carrying a plurality of hooks, said hooks each having a first member extending outwardly from said chain and including an interception point, said hooks each further including at least one prong extending from said first member at a spaced location from said interception point;

a feed mechanism disposed adjacent said chain and said hooks for depositing links onto said hooks such that predetermined twist points between adjacent links are engaged and carried by said interception point of said first member; and, a displacement mechanism disposed adjacent said chain, said displacement mechanism moving each engaged twist point carried by said interception point onto said prong to form said links into a spiral loop adapted to be deposited on a skewer.

2. The device of claim 1 wherein a portion of said first member defining said interception point is disposed transverse to said prong such that each engaged twist point is rotated during movement from said interception point to said prong.

3. The device of claim 2 wherein said displacement mechanism comprises a reciprocating shackle which engages adjacent links to move an engaged twist point disposed therebetween from said interception point onto said prong.

4. The device of claim 1 wherein said interception point is disposed on a portion of said first member which extends generally perpendicular to a direction of movement of said chain and said prong extends generally in the direction of movement of said chain, whereby as said twist point moves from said interception point onto said prong, said twist point is rotated approximately 90°.

5. The device of claim 4 wherein said displacement mechanism comprises a reciprocating shackle which engages adjacent links to move an engaged twist point disposed therebetween from said interception point onto said prong.

6. The device of claim 1 wherein said first member includes a portion which is inclined downwardly from said interception point to said prong.

7. The device of claim 6 wherein said portion which is inclined further comprises upper and lower sections thereof disposed at an angle relative to one another, with said lower section being inclined at a steeper angle than said upper section.

8. The device of claim 1 further comprising a hump in said first member adjacent said interception point for maintaining said twist point at said interception point until said displacement mechanism is activated.

9. The device of claim 1 further comprising means for reducing the distance between successive twist points of said links after said links have been deposited onto said hooks by said feed mechanism.

10. The device of claim 9 wherein said chain further comprises an endless chain extending around a pair of guide wheels, at least one of said guide wheels being driven.

11. The device of claim 10 wherein said feed mechanism is disposed adjacent a first one of said guide wheels such that said links are deposited on said hooks by said feed mechanism as said hooks pass around said first guide wheel, whereby as said hooks leave said first guide wheel with said links deposited thereon, the distance between engaged twist points is reduced.

12. The device of claim 11 further including means for adjusting the position of said feed mechanism along the periphery of said first guide wheel.

13. The device of claim 1 further comprising at least one spreading element attached to each hook adjacent said prong.

14. The device of claim 13 wherein said prong extends from said first member and two spreading elements are disposed on opposite sides of said prong.

15. The device of claim 14 wherein said spreading elements are connected to said first member and extending generally parallel to and below said prong.

16. The device of claim 14 wherein said prong rises slightly towards a free end thereof.

17. The device of claim 1 wherein, as viewed in a direction of movement of said chain, said hooks are generally shaped as a "U" having two legs and a web connected therebetween, said hooks being attached to said chain at one leg thereof, said prong being located at the other leg thereof and said interception point being located in the web thereof.

18. The device of claim 1 wherein said hooks may be tilted about a horizontal axis extending perpendicular to a direction of movement of said chain such that said twist points may be slipped off of said prong downstream of said displacement mechanism.

19. The device of claim 1 further comprising a photoelectric barrier for detecting twist points in a chain of said links exiting said feed mechanism, said photoelectric barrier supplying signals for controlling cycles of said device.

20. The device of claim 1 wherein said displacement mechanism comprises a reciprocating shackle which engages adjacent links to move an engaged twist point disposed therebetween from said interception point onto said prong.

21. The device of claim 1 wherein said interception point comprises a bend in said first member.

22. The device of claim 1 wherein said hooks are attached to said chain at attachment points which lie on a horizontal axis common to a twist point supporting portion of said prong.

23. A method of suspending a chain of connected sausage links or the like in a spiral loop, the method comprising the steps of:

conveying a plurality of hooks past a link feeding mechanism;

feeding connected links onto said hooks such that twist points between predetermined adjacent links are engaged and carried by said hooks with said twist points extending generally in the direction of movement of said hooks; and, rotating said twist points engaged by said hooks transversely to the direction of movement of said hooks to thereby form a spiral loop of said connected links.

24. The method of claim 23 wherein the step of rotating said twist points further comprises moving each engaged twist point from a portion of said hook disposed generally perpendicular to the direction of movement of said hooks to a portion of said hook disposed generally parallel to the direction of movement of said hooks.

25. The method of claim 23 further comprising the step of decreasing the distance between twist points engaged by adjacent hooks after said adjacent hooks have engaged said twist points.

26. The method of claim 23 further comprising the step of moving each engaged twist portion downwardly toward a free hook end as said engaged twist point is rotated.

27. The method of claim 26 further comprising the step of moving each engaged twist point downwardly on an inclined plane to said free hook end as said engaged twist point is rotated.

28. The method of claim 23 further comprising the step of spreading adjacent links apart upon rotation of an engaged twist point disposed therebetween.

29. The method of claim 23 further comprising the steps of:

conveying a selected number of hooks adjacent to a skewer such that said skewer passes through a lengthwise path created within said spiral loop of links; and, rotating said selected number of hooks to thereby release said spiral loop of links onto said skewer.

* * * * *

UNITED STATES PATENT AND TRADEMARK OFFICE
CERTIFICATE OF CORRECTION

PATENT NO. : 5,354,229
DATED : October 11, 1994
INVENTOR(S) : Klaus Markwardt et al It is certified that error appears in the above-indentified patent and that said Letters Patent is hereby corrected as shown below:

At column 4, line 5 please delete "embodiment means" and insert in its place -- embodiment by means --

Signed and Sealed this

Twenty-eight Day of March, 1995

Attest:

BRUCE LEHMAN

Attesting Officer    Commissioner of Patents and Trademarks